(12) United States Patent
Takeoka et al.

(10) Patent No.: US 8,451,579 B2
(45) Date of Patent: May 28, 2013

(54) METALIZED FILM CAPACITOR

(75) Inventors: Hiroki Takeoka, Nara (JP); Hiroshi Kubota, Toyama (JP); Hiroshi Fujii, Toyama (JP); Yukikazu Ohchi, Osaka (JP); Yukihiro Shimasaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 202 days.

(21) Appl. No.: 12/992,946

(22) PCT Filed: Jun. 30, 2009

(86) PCT No.: PCT/JP2009/003006
§ 371 (c)(1),
(2), (4) Date: Nov. 16, 2010

(87) PCT Pub. No.: WO2010/004700
PCT Pub. Date: Jan. 14, 2010

(65) Prior Publication Data
US 2011/0090618 A1 Apr. 21, 2011

(30) Foreign Application Priority Data

Jul. 8, 2008 (JP) .................................. 2008-177744

(51) Int. Cl.
*H01G 2/12* (2006.01)
*H01G 2/22* (2006.01)
*H01G 4/255* (2006.01)

(52) U.S. Cl.
USPC ......................................... 361/272; 361/323

(58) Field of Classification Search
USPC .................. 361/273, 303, 305, 311, 321–313
See application file for complete search history.

(56) References Cited

U.S. PATENT DOCUMENTS

| | | | | |
|---|---|---|---|---|
| 5,610,796 A | * | 3/1997 | Lavene | 361/303 |
| 5,696,663 A | * | 12/1997 | Unami et al. | 361/305 |
| 5,757,607 A | * | 5/1998 | Folli | 361/273 |
| 6,532,145 B1 | * | 3/2003 | Carlen et al. | 361/508 |
| 6,724,610 B1 | * | 4/2004 | Eriksson et al. | 361/303 |
| 6,757,151 B2 | * | 6/2004 | Eriksson et al. | 361/273 |
| 7,460,352 B2 | * | 12/2008 | Jamison et al. | 361/273 |
| 7,697,261 B2 | * | 4/2010 | Okuno et al. | 361/273 |
| 2007/0258190 A1 | | 11/2007 | Irwin et al. | |
| 2008/0259522 A1 | | 10/2008 | Okuno et al. | |

FOREIGN PATENT DOCUMENTS

| | | |
|---|---|---|
| CN | 101156224 A | 4/2008 |
| JP | 08-250367 | 9/1996 |
| JP | 2007-300126 A | 11/2007 |
| JP | 2008-115417 A | 5/2008 |
| WO | WO 2007/129695 A1 | 11/2007 |

OTHER PUBLICATIONS

International Search Report for International Application No. PCT/JP2009/003006, Oct. 6, 2009, Panasonic Corporation.

* cited by examiner

*Primary Examiner* — Eric Thomas
(74) *Attorney, Agent, or Firm* — RatnerPrestia

(57) ABSTRACT

A metalized film capacitor includes a first dielectric film, a first metal thin-film electrode provided on a surface of the first dielectric film, a second dielectric film provided on the first metal thin-film electrode, and a second metal thin-film electrode provided on the second dielectric film, such that the second metal thin-film electrode faces the first metal thin-film electrode across the second dielectric film. The surface of the first dielectric film has a surface energy ranging from 25 mN/m to 40 mN/m. The metalized film capacitor exhibits high heat resistance and a preferable self-healing effect.

8 Claims, 7 Drawing Sheets

Fig. 3

Young-Good-Girifalco-Fowkes Equation $$\gamma_l(1+\cos\theta) = 2\left(\sqrt{\gamma_s^{LW}\gamma_l^{LW}} + \sqrt{\gamma_s^+\gamma_l^-} + \sqrt{\gamma_s^-\gamma_l^+}\right)$$

$\gamma_l^{LW}$ : Non-Polar Component of Surface Tension of Liquid $\gamma_l^-$ : Basic Polar Component of Surface Tension of Liquid $\gamma_s^+$ : Acidic Polar Component of Surface Tension of Liquid θ : Contact Angle

| Liquid | $\lambda_l$ | $\lambda_l^{LW}$ | $\lambda_l^+$ | $\lambda_l^-$ |
|---|---|---|---|---|
| Water | 72.8 | 21.8 | 25.5 | 25.5 |
| Glycerin | 64 | 34 | 3.92 | 57.4 |
| Diiodomethane | 50.8 | 50.8 | 0 | 0 |

Fig. 6

| | Surface Energy (mN/m) | Initial Withstanding Voltage Yield Rate | Voltage BDV (V) |
|---|---|---|---|
| Example 1 | 40 | 8/10 | 1000 |
| | 36 | 10/10 | 1000 |
| | 32 | 10/10 | 1000 |
| | 28 | 10/10 | 950 |
| | 25 | 10/10 | 850 |
| Example 2 | 40 | 8/10 | 1000 |
| | 36 | 10/10 | 1000 |
| | 32 | 10/10 | 1000 |
| | 28 | 10/10 | 950 |
| | 25 | 10/10 | 850 |
| Example 3 | 40 | 8/10 | 1000 |
| | 36 | 10/10 | 1000 |
| | 32 | 10/10 | 1000 |
| | 28 | 10/10 | 950 |
| | 25 | 10/10 | 850 |
| Comparative Example | 43 | 5/10 | Short-Circuit |

METALIZED FILM CAPACITOR

This application is a U.S. National Phase Application of Pct International Application PCT/W2009/003006.

TECHNICAL FIELD

The present invention relates to a metalized film capacitor used for electronic devices, electric devices, industrial devices, and vehicles, especially, which is suitable for smoothing, filtering, and snubbering in inverter circuits for driving motors of hybrid electric vehicles.

BACKGROUND ART

In recent years, from the viewpoint of environmental protection, various electric devices have generally been controlled by inverter circuits for promoting energy saving and highly efficient operation. Particularly, in car industries, since a hybrid electric vehicle (HEV) which is driven by an electric motor and an engine is appeared on the market, car manufacturers have been promoting eco-friendly technology development focused on energy saving and high efficiency.

A motor for the HEV works with a range of voltage as high as several hundred volts. Considering above, manufacturers focus on a metallized film capacitor having preferable electric characteristics of a high withstand voltage and a low loss as being suitable for the motor. Besides, in response to demands of the market on maintenance-free components, the metallized film capacitor has been used because of its extremely long life time.

A metallized film capacitor for HEVs needs to have a high heat resistance and a high withstand voltage. To enhance these characteristics, many studies and suggestions have been made.

FIG. 9 is a perspective view of conventional metalized film capacitor 501 described in Patent Literature 1. Metalized film 21 includes dielectric film 22 of polypropylene and electrode film 23 that is metal-evaporated on a surface of film 22. Electrode film 23 extends in a longitudinal direction of film 21. Neither margin section 22A nor grid-like slit section 22B has electrode film 23 formed thereon. Fuse section 23B connects between segment sections 23A each of which serves as a function area constituting a unit capacitor. An evaporated electrode formed in the function area and an evaporated electrode formed in a electrode lead-out area are arranged in the longitudinal direction of film 21 and are separated by slit section 22C. Fuse section 23C connects between the evaporated electrodes in the two areas.

Metalized film 24 includes dielectric film 25 made of polypropylene and electrode film 26 that is metal-evaporated on a surface of dielectric film 25. Electrode film 26 extends toward in the longitudinal direction of dielectric film 21. Neither margin section 25A nor grid-like slit section 25B has electrode film 26 formed thereon. Fuse section 26B connects between segment sections 26A each of which serves as a function area constituting a unit capacitor. An evaporated electrode formed in the function area and an evaporated electrode formed in an electrode lead-out area are arranged in the longitudinal direction of film 21, and are separated by slit section 25C. Fuse section 26C connects between the evaporated electrodes in the two areas. Metalized film capacitor 501 has metal-sprayed electrodes 27 and 28 for leading out to external electrodes.

Conventional metalized film capacitor 501 is an assembly of the unit capacitors. Fuse sections 23B and 26B are provided between the unit capacitors, and fuse section 23C and 26C are provided between the function areas and the lead-out area of the capacitors. In response to anomalous condition, such as an excessively-large current flowing in the capacitor, fuse sections 23B, 23C, 26B, and 26C are cut to protect metalized film capacitor 501 from breakdown, thus reducing a decrease of a capacitance for maintaining the function of the capacitor. Even under a serious condition where fuse sections 23B and 26B cannot disconnect short-circuit currents at the breakdown, fuse sections 23C and 26C are cut the connection between electrodes 27 and 28 and the function area of the capacitor, thus protecting capacitor 501 from facing problems due to short-circuit.

In conventional metalized film capacitor 501, dielectric films 22 and 25 are made of polypropylene (PP) films. The upper withstanding temperature of PP film is low, about 110° C., which is much below a heatproof temperature of 150° C. required for capacitors used for vehicles.

In order to improve heatproof characteristics, dielectric films 22 and 25 may be made of dielectric film in which inorganic filler is added to a polymer material having a polar bond in its main chain. The polar bond includes an ester bond, an ether bond, an amide bond, and an imide bond. The materials that satisfy above are, for example, polyethylene naphthalate (PEN), polyphenylene sulfide (PPS), and polyethylene terephthalate (PET). However, the dielectric film made of the above materials has the following problem.

An electrode film manufactured by a metal-evaporation has a self-healing (SH) effect. Specifically, if an electrical breakdown occurs in an area with defective insulation, a metal-evaporated electrode disposed around the area having the breakdown evaporates and disperses by the energy occurred in short-circuit. The SH effect recovers an insulation property of the film. If the capacitor has a short-circuited part between the electrode films, the SH effect allows the capacitor to function properly. However, in the aforementioned dielectric film, which is made of a polymer material having a polar bond in its main chain and inorganic filler, the SH effect is low. That is, the film, such as polyethylene naphthalate (PEN), polyphenylene sulfide (PPS), and polyethylene terephthalate (PET), for capacitor 501 can hardly used instead of PP film.

Patent Literature 1: Japanese Patent Laid-Open Publication No. 8-250367

SUMMARY OF THE INVENTION

A metalized film capacitor includes a first dielectric film, a first metal thin-film electrode provided on a surface of the first dielectric film, a second dielectric film provided on the first metal thin-film electrode, and a second metal thin-film electrode provided on the second dielectric film, such that the second metal thin-film electrode faces the first metal thin-film electrode across the second dielectric film. The surface of the first dielectric film has a surface energy ranging from 25 mN/m to 40 mN/m.

The metalized film capacitor exhibits high heat resistance and a preferable self-healing effect.

BRIEF DESCRIPTION OF THE DRAWINGS

FIG. 3 shows values for calculating surface energy of the metalized film capacitor in accordance with Embodiment 1.

FIG. 6 shows measurement results of the metalized film capacitor in accordance with Embodiment 1.

DETAILED DESCRIPTION OF PREFERRED EMBODIMENTS

Exemplary Embodiment 1

Figure 1:
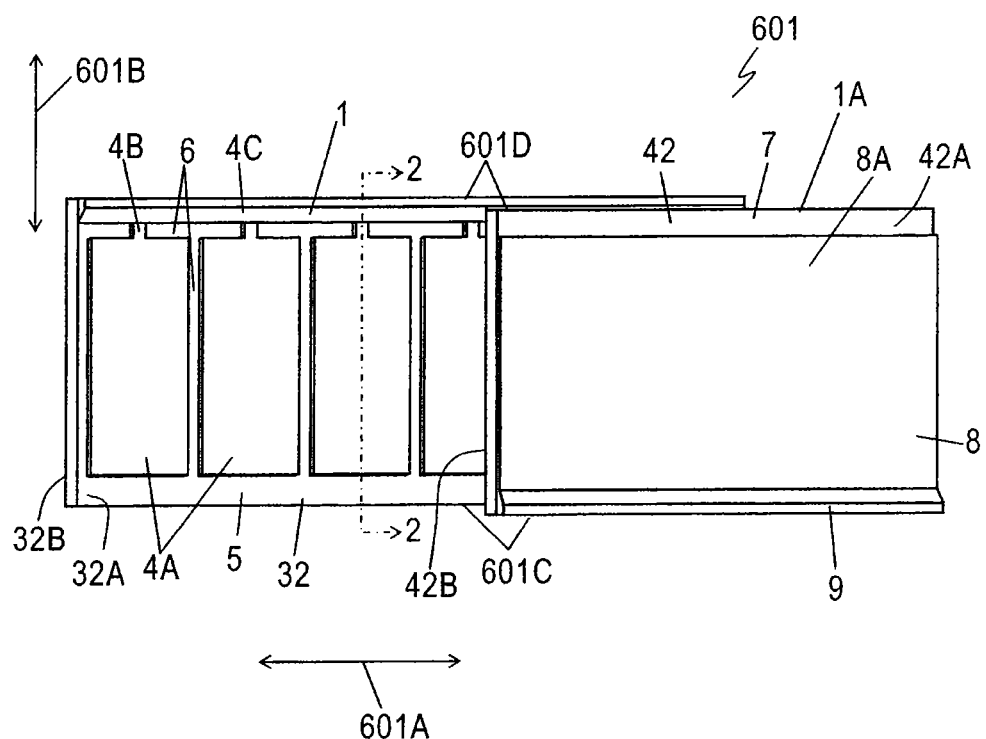
FIG. 1 is an exploded plan view of a metalized film capacitor in accordance with Exemplary Embodiment 1 of the present invention.
Figure 2:
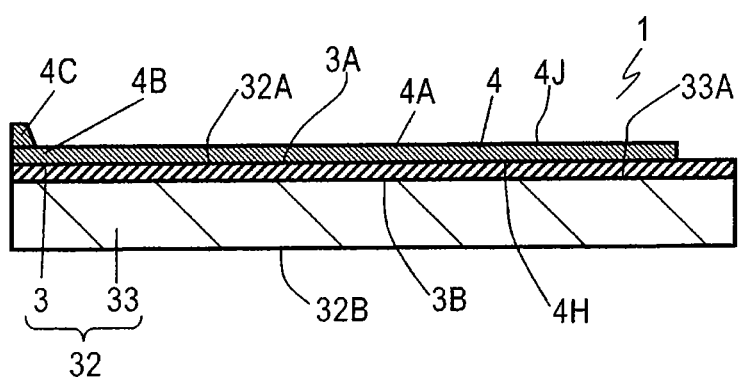
FIG. 2 is a sectional view of the metalized film capacitor on line 2-2 shown in FIG. 1.

FIG. 1 is an exploded plan view of metalized film capacitor 601 in accordance with Exemplary Embodiment 1 of the present invention. Metalized film capacitor 601 includes metalized films 1 and 1A. FIG. 2 is a sectional view of metalized film capacitor 601 on line 2-2 for illustrating a section of metalized film 1.

As shown in FIG. 2, metalized film 1 includes dielectric film 32 and metal thin-film electrode 4 provided on surface 32A of dielectric film 32. Dielectric film 32 includes base film 33 and foundation layer 3 disposed beneath surface 33A of base film 33. Foundation layer 3 has surface 3B situated on surface 33A of base film 33, and surface 3A opposite to surface 3B. Foundation layer 3 is situated on base film 33, that is, surface 3A of foundation layer 3 is surface 32A of dielectric film 32. Metal thin-film electrode 4 is formed by evaporating metal, such as aluminum, to have a predetermined pattern on surface 32A of dielectric film 32. Foundation layer 3 contacts metal thin-film electrode 4.

As shown in FIG. 1, Metalized film 1 has a width in widthwise direction 601B, and extends in longitudinal direction 601A perpendicular to widthwise direction 601B. Surface 32A of dielectric film 32 has margin section 5 exposed from metal thin-film electrode 4 at edge 601C in widthwise direction 601B. Margin section 5 extends continuously in longitudinal direction 601A. Metal thin-film electrode 4 includes low-resistive section 4C extending in longitudinal direction 601A, plural sectioned electrodes 4A arranged in longitudinal direction 601A, and plural fuse sections 4B. Respective ones of fuse sections 4B connect respective ones of sectioned electrodes 4A with low-resistive section 4C. Sectioned electrodes 4A are separated from each other across slit sections 6 exposing surface 32A of dielectric film 32 from metal thin-film electrode 4. Low-resistive section 4C is located at edge 601D opposite to edge 601C in widthwise direction 601B. Low-resistive section 4C is thicker than each of sectioned electrodes 4A and fuse sections 4B, and therefore, has resistance smaller than that of each of sectioned electrodes 4A and fuse sections 4B. Metal thin-film electrode 4 (sectioned electrode 4A) has surface 4H situated on surface 32A of dielectric film 32, and surface 4J opposite to surface 4H. Dielectric film 42 is provided on surface 4J of metal thin-film electrode 4 (sectioned electrode 4A).

Base film 33 according to Embodiment 1 is mainly made of polyethylene naphthalate (PEN) and has a thickness of 2.0 μm and a width of 30 mm, and consequently provides capacitor 601 with high heat resistance that meets the requirements for vehicles. Base film 33 may be made of dielectric film, such as polyphenylene sulfide (PPS) film or polyethylene terephthalate (PET) film, which has high heatproof temperature and which is mainly made of a polymer material having a polar bond, such as ester bond, ether bond, amide bond, or imide bond, in its main chain. In particular, the film may be preferably made of PEN film or a PEN-based film, such as PEN-based alloy film.

PEN film firmly adheres to metal-thin film made by metal evaporation. Therefore, the metalized film of the metalized film capacitor employing the PEN film suppresses evaporation and dispersion of the metal thin-film electrode at insulation breakdown. This prevents the metal thin-film electrode from having sufficient self-healing (SH) effect recovering insulation.

Foundation layer 3 is made of a silicon-based material coated on surface 33A of PEN-made base film 33. Foundation layer 3 provides surface 32A of dielectric film 32 with a surface energy of 25 mN/m to 40 mN/m. Foundation layer 3 may be made of any one of a silicon-based compound, a fluorine-based compound, and a hydrocarbon-based compound as long as foundation layer 3 causes the surface energy of surface 32A to smaller than that of surface 33A of base film 33 and to be maintained between 25 mN/m to 40 mN/m.

Surface energy $\gamma_1$ can be calculated from contact angle $\theta$ by the Young-Good-Girifalco-Fowkes equation shown in FIG. 3. Contact angle $\theta$ between the film and each of three different liquids: water, ethylene glycol solution, and diiodomethane solution, with a contact-angle goniometer. Parameters of these liquids are cited from a reference written by R. J. Good, et al. J. Adhension, 1996, vol. 59, pp. 25-37.

As shown in FIG. 1, metalized film 1 has a width in widthwise direction 601B and extends in longitudinal direction 601A that is perpendicular to widthwise direction 601B. Surface 32A of dielectric film 32 has margin section 5 exposed from metal thin-film electrode 4 at edge 601C in widthwise direction 601B. Margin section 5 extends continuously in longitudinal direction 601A. Metal thin-film electrode 4 includes low-resistive section 4C extending in longitudinal direction 601A, plural sectioned electrodes 4A arranged in longitudinal direction 601A, and plural fuse sections 4B. Respective ones of fuse sections 4B connect respective ones of sectioned electrodes 4A with low-resistive section 4C. Sectioned electrodes 4A are separated from each other across slit sections 6 exposing surface 32A of dielectric film 32 from metal thin-film electrode 4. Low-resistive section 4C is placed at edge 601D opposite to edge 601C in widthwise direction 601B. Low-resistive section 4C is thicker than sectioned electrode 4A and fuse section 4B, and accordingly, has resistance smaller than that of each of sectioned electrode 4A and fuse section 4B. The width of fuse section 4 in longitudinal direction 601A is smaller than that of sectioned electrode 4A in longitudinal direction 601A.

Metalized film 1A includes dielectric film 42 made of PEN with a thickness of 2.0 μm and a width of 30 mm, and metal thin-film electrode 8 provided on surface 42A of dielectric film 42. Surface 42A of dielectric film 42 has margin section 7 exposed from metal thin-film electrode 8. Margin section 7 is provided at edge 601D in widthwise direction 601B and extends continuously in longitudinal direction 601A. Metal thin-film electrode 8 includes electrode section 8A and low-resistive section 9. Electrode section 8A faces sectioned electrodes 4A across dielectric film 42. Low-resistive section 9 is provided at edge 601C in widthwise direction 601B, and extends in longitudinal direction 601A. Low-resistive section 9 is thicker than electrode section 8A, and therefore, has resistance smaller than that of each of sectioned electrode 4A and fuse section 4B.

Dielectric film 42 of metalized film 1A has surface 42A and surface 42B opposite to surface 42A. Surface 42B is situated on sectioned electrodes 4A of metal thin-film electrode 4 of metalized film 1, and 42B faces surface 32A of dielectric film 32 across sectioned electrodes 4A. Respective sectioned electrodes 4A face electrode section 8A across dielectric film 42 and constitutes unit capacitors. Fuse sections 4B connects the unit capacitors in parallel with each other.

Figure 4:
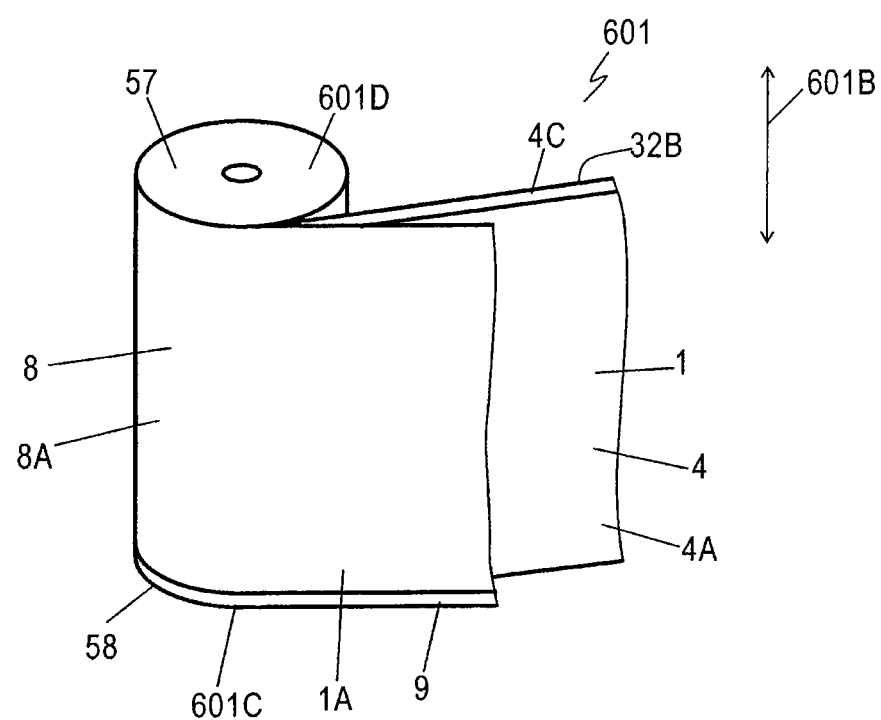
FIG. 4 is a perspective view of the metalized film capacitor in accordance with Embodiment 1.

FIG. 4 is a perspective view of metalized film capacitor 601 in accordance with Embodiment 1. Metalized films 1 and 1A overlap are rolled while such that metal thin-film electrode 4 of metalized film 1 is located on surface 42B of dielectric film 42 of metalized film 1A. Metalized films 1 and 1A may be stacked to have a layered structure. Electrode section 8A of metal thin-film electrode 8 on metalized film 1A is located on surface 32B of dielectric film 32 opposite to surface 32A. That is, electrode section 8A is located opposite to sectioned electrode 4A of metal thin-film electrode 4 beyond dielectric film 32. Metal-sprayed electrode 57 is provided on edge 601D of rolled metalized films 1 and 1A and connected to low-resistive section 4C of metal thin-film electrode 4. Similarly, metal-sprayed electrode 58 is provided on edge 601C of rolled around metalized films 1 and 1A and connected to low-resistive section 9 of metal thin-film electrode 8. Electrodes 57 and 58 are formed by spraying metal on edges 601C and 601D of the rolled structure, respectively.

Figure 5:
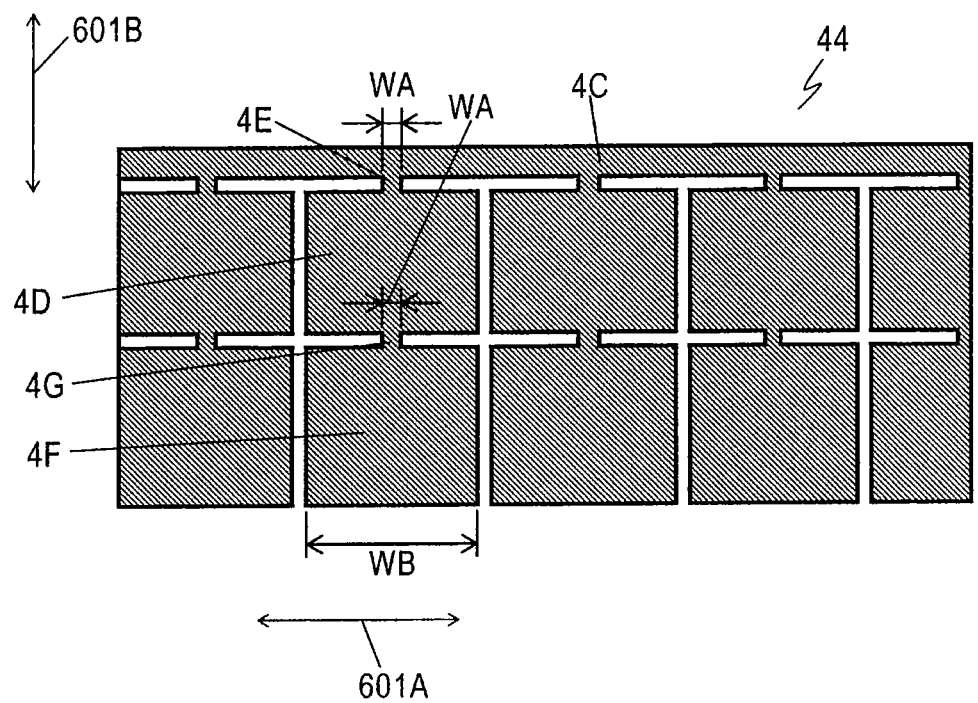
FIG. 5 is a plan view of another metalized film of the metalized film capacitor in accordance with Embodiment 1.

FIG. 5 is a plan view of another metal thin-film electrode 44 provided on metalized film 1 of metalized film capacitor 601 in accordance with Embodiment 1. In FIG. 5, components identical to those of metal thin-film electrode 4 shown in FIG. 1 are denoted by the same reference numerals, and their explanation will be omitted. Metal thin-film electrode 44 includes sectioned electrodes 4D arranged in longitudinal direction 601A, sectioned electrodes 4F arranged in longitudinal direction 601A, low-resistive section 4C, fuse sections 4E, and fuse sections 4G. Respective section electrodes 4D and respective section electrodes 4F are arranged in widthwise direction 601B. Respective fuse sections 4E connect low-resistive section 4C with respective sectioned electrode 4D. Respective fuse sections 4G connect respective sectioned electrodes 4D with respective sectioned electrodes 4F. Similarly to sectioned electrodes 4A shown in FIG. 1, sectioned electrodes 4D and 4F face electrode section 8A across dielectric film 42. Sectioned electrodes 4D and 4F face electrode section 8A across dielectric film 42 and constitute unit capacitors. Fuse sections 4E and 4G connect the unit capacitors in parallel with each other. Width WA of fuse sections 4E and 4G in longitudinal direction 601A is smaller than width WB of sectioned electrodes 42D and 42F in longitudinal direction 601A.

Samples of Example 1 of metalized film capacitor 601 including metal thin-film electrode 44 shown in FIG. 5 were produced and measured in a withstanding voltage. Samples of a comparative example of a capacitor were produced and measured in withstanding voltage. The comparative example included metal thin-film electrode 44 on dielectric film 32. The comparative example included base film 33 and dielectric film 42 both made of PEN, and did not include foundation layer 3. FIG. 6 shows the measurement results of the withstanding voltages of the samples of Example 1 and the comparative sample.

In the samples of Example 1 and the comparative sample of the metalized film capacitor, fuse section 4E has width WA of 0.2 mm and sectioned electrode 4D has width WB of 15 mm. In the samples of Example 1, the surface energy measured on surface 32A of dielectric film 32 ranges from 25 mN/m to 40 mN/m. In the comparative example, the surface energy on a surface of the dielectric film is 40 mN/m. All of the samples have a capacitance of 100 µF. The initial withstand voltage yield rate represents the ratio of the number of samples without short-circuiting to the number of all the samples when a predetermined voltage is applied at room temperature. In the voltage step-up test, a voltage applied to the samples is raised by a step increment at a temperature of 120° C. The breakdown voltage (BDV) is the voltage at which the capacitance of each sample decreases to −5% of the initial capacitance.

As shown in FIG. 6, Example 1 exhibits preferable result, that is, has a higher initial withstanding voltage yield rate and a higher voltage in the voltage step-up test than the comparative example which does not include foundation layer 3. Samples in which foundation layer 3 has a surface energy ranging from 25 mN/m to 36 mN/m particularly have a high withstanding voltage.

In the samples with a surface energy ranging from 25 mN/m to 28 mN/m, the voltage in the voltage step-up test is slightly lower, however, is improved by changing the pattern of metal thin-film electrode 44.

Thus, in metalized film capacitor 601 according to Embodiment 1, dielectric film 32 includes base film 33 made of PEN. Surface 32A of dielectric film 32 on which metal thin-film electrode 4 (44) is provided has a surface energy ranging from 25 mN/m to 40 mN/m. This arrangement decreases an adhering force between dielectric film 32 and metal thin-film electrode 4 (44). Therefore, even if an electrical breakdown occurs in an area with defective insulation in metalized film 42 (44), the moderate adhering force prevents metal thin-film electrode 4 (44) from evaporating and spattering at a portion of metal thin-film electrode 4 (44) located around the defective area. This structure allows metalized film capacitor 601 to not only maintain high heat resistance of the PEN film but also have a sufficient SH effect for recovering insulation.

Exemplary Embodiment 2

Figure 7:
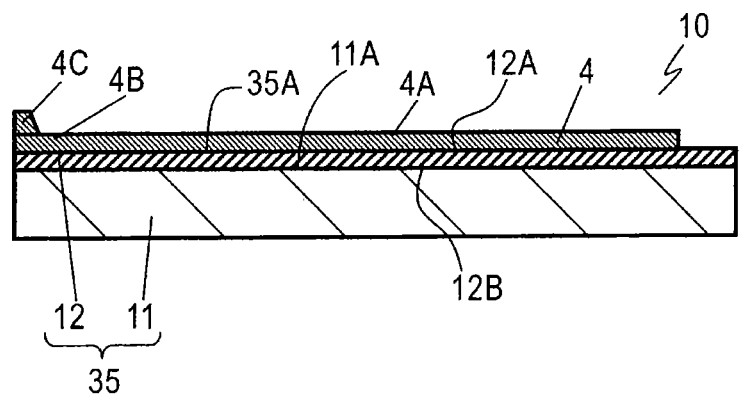
FIG. 7 is a sectional view of a metalized film of a metalized film capacitor in accordance with Exemplary Embodiment 2 of the invention.

FIG. 7 is a sectional view of metalized film capacitor 10 in accordance with Exemplary Embodiment 2 of the present invention. In FIG. 7, components identical to those of metalized film 1 shown in FIGS. 1 and 2 according to Embodiment 1 are denoted by the same reference numerals, and their explanation will be omitted.

Metalized film 10 includes dielectric film 35 corresponding to dielectric film 32 of metalized film 1 according to Embodiment 1 shown in FIG. 2. Metal thin-film electrode 4 is formed on surface 35A of dielectric film 35. Dielectric film 35 includes base film 11 and surface layer 12 provided on surface 11A of base film 11. Surface layer 12 has surface 12B situated on surface 11A of base film 11 and surface 12A opposite to surface 12B. Surface layer 12 is provided on surface 35A of dielectric film 35, that is, surface 12A of surface layer 12 is surface 35A of dielectric film 35. Metal thin-film electrode 4 is formed by evaporating metals, such as aluminum, into a predetermined pattern on surface 35A of dielectric film 35.

Base film 33 according to Embodiment 1 is mainly made of polyethylene naphthalate (PEN) and has a thickness of 2.0 µm and a width of 30 mm, and consequently provides capacitor 601 with high heat resistance that meets the requirements for vehicles. Base film 33 may be made of dielectric film, such as polyphenylene sulfide (PPS) film or polyethylene terephthalate (PET) film, which has high heatproof temperature and which is mainly made of a polymer material having a polar bond, such as ester bond, ether bond, amide bond, or imide bond, in its main chain. In particular, the film may be preferably made of PEN film or a PEN-based film, such as PEN-based alloy film.

Base film 11 contains an additive made of a silicon-based material mixed therewith. The mixed silicon-based material bleeds out of surface 11A of base film 11 and forms surface layer 12. Since the surface energy of the additive is smaller than that of the a main material of base film 11, the surface energy of surface 12A of surface layer 12, i.e., surface 35A of dielectric film 35 ranges from 25 mN/m to 40 mN/m. Surface layer 12 may be formed by an additive made of any one of a silicon-based compound, a fluorine-based compound, and a hydrocarbon-based compound bleeding out so that surface 35A has a surface energy ranging from 25 mN/m to 40 mN/m.

Samples of Example 2 of the metalized film capacitor including dielectric film 35 and having a structure similar to that of Example 1 according to Embodiment 1 were produced and measured in a withstanding voltage. FIG. 6 shows the measurement result of the voltage.

As shown in FIG. 6, Example 2 exhibits preferable result, that is, has a higher initial withstanding voltage yield rate and a higher voltage in the voltage step-up test than the comparative example which does not include foundation layer 3. The samples in which surface layer 12 has a surface energy ranging from 25 mN/m to 36 mN/m particularly have a high withstanding voltage.

Thus, the metalized film capacitor according to Embodiment 2 not only maintains high heat resistance of the PEN film but also has a sufficient SH effect for recovering insulation.

Exemplary Embodiment 3

Figure 8:
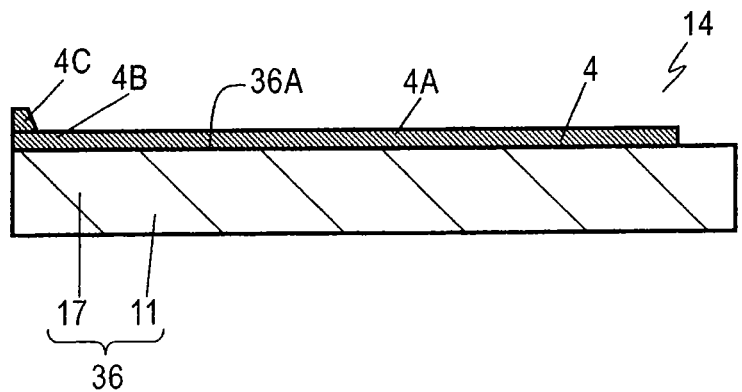
FIG. 8 is a sectional view of a metalized film of a metalized film capacitor in accordance with Exemplary Embodiment 3 of the invention.
Figure 9:
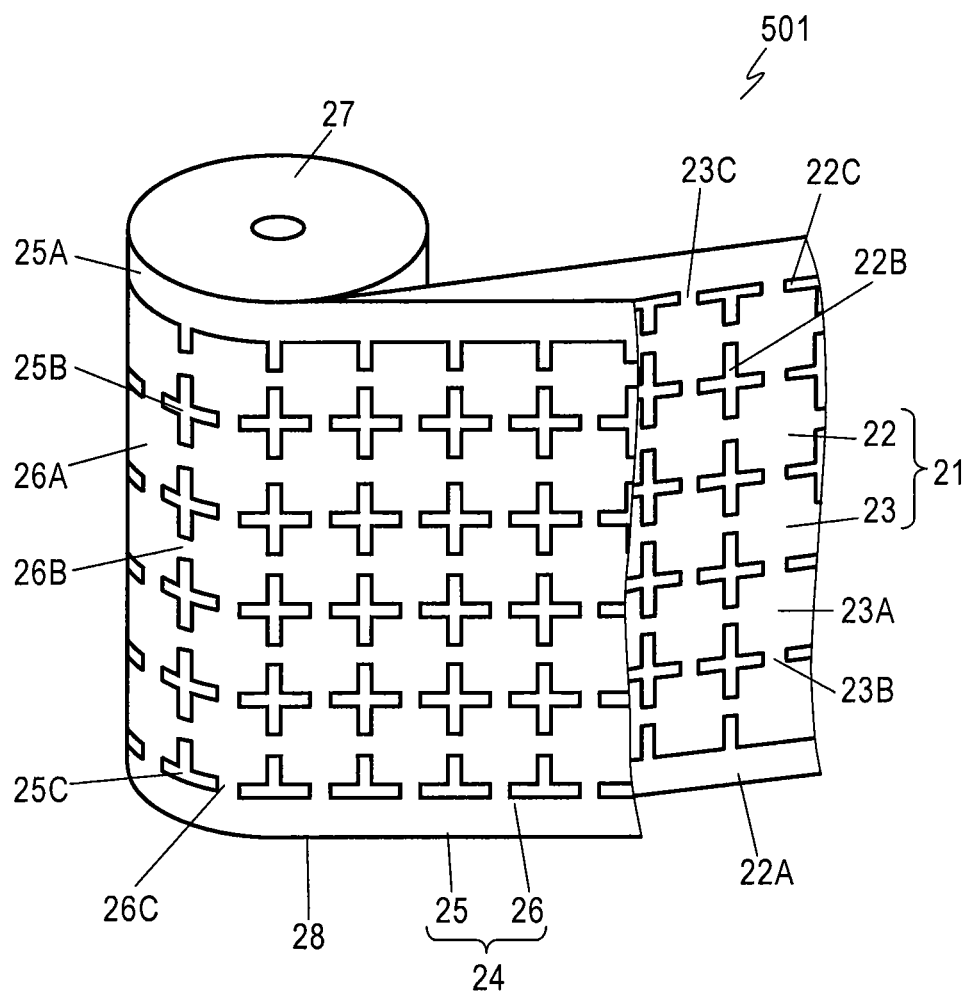
FIG. 9 is a perspective view of a conventional metalized film capacitor.

FIG. 8 is a sectional view of metalized film 14 of a metalized film capacitor in accordance with Exemplary Embodiment 3 of the present invention. In FIG. 8, components identical to those of metalized film 1 shown in of FIGS. 1 and 2 according to Embodiment 1 are denoted by the same reference numerals, and their explanation will be omitted.

Metalized film 14 includes dielectric film 36 instead of dielectric film 32 of metalized film 1 according to Embodiment 1 shown in FIG. 2. Metal thin-film electrode 4 is provided on surface 36A of dielectric film 36. Metal thin-film electrode 4 is formed by evaporating metal, such as aluminum, into a predetermined pattern on surface 36A of dielectric film 36.

Dielectric film 36 is made of alloy of base film 11 and additive 17 made of a silicon-based material mixed in base film 11. Base film 11 is a polyethylene naphthalate (PEN)-based film with a thickness of 2.0 μm and a width of 30 mm. Base film 11 provides capacitor 601 with high heat resistance that meets the requirements for vehicles. Base film 11 may be a dielectric film made of polyphenylene sulfide (PPS) or polyethylene terephthalate (PET) which has high heatproof temperature and are mainly made of a polymer material having a polar bond, such as, an ester bond, an ether bond, an amide bond, or an imide bond, in its main chain. In particular, a PEN film or a PEN-based film, for example, a PEN-based alloy, is preferable.

Since the additive has a surface energy smaller than that of the main material of base film 11, the surface energy of surface 36A of dielectric film 36 ranges from 25 mN/m to 40 mN/m. Additive 17 to be added to base film 11 may be made of any one of a silicon-based compound, a fluorine-based compound, and a hydrocarbon-based compound so that surface 36A has a surface energy ranging from 25 mN/m to 40 mN/m.

Samples of Example 3 of the metalized film capacitor including dielectric film 35 and having a structure similar to Example 1 according to Embodiment 1 were produced and measured in a withstanding voltage. FIG. 6 shows the measurement result of the voltage.

As shown in FIG. 6, Example 3 exhibits preferable result, that is, has a higher initial withstanding voltage yield rate and a higher voltage in the voltage step-up test than the comparative example which does not include foundation layer 3. The samples in which dielectric film 36 has a surface energy ranging from 25 mN/m to 36 mN/m particularly have a high withstanding voltage.

Thus, the metalized film capacitor according to Embodiment 3 not only maintains high heat resistance of the PEN film but also has a sufficient SH effect for recovering insulation.

INDUSTRIAL APPLICABILITY

A metalized film capacitor according to the present invention has high heat resistance and a preferable self-healing effect, and is useful as a metalized film capacitor for vehicles requiring particularly high heat resistance to capacitors.

REFERENCE MARKS IN THE DRAWINGS

3 Foundation Layer
4 Metal Thin-Film Electrode (First Metal Thin-Film Electrode)
8 Metal Thin-Film Electrode (Second Metal Thin-Film Electrode)
11 Base Film
12 Surface Layer
17 Additive
32 Dielectric Film (First Dielectric Film)
42 Dielectric Film (Second Dielectric Film)
57 Metal-Sprayed Electrode (First Metal-Sprayed Electrode)
58 Metal-Sprayed Electrode (Second Metal-Sprayed Electrode)

The invention claimed is:
1. A metalized film capacitor comprising:
a first dielectric film having a surface;
a first metal thin-film electrode having a first surface and a second surface opposite to the first surface, the first surface of the first metal thin-film electrode being situated on the surface of the first dielectric film;
a second dielectric film provided on the second surface of the first metal thin-film electrode, the second dielectric film having a surface; and
a second metal thin-film electrode provided on the surface of the second dielectric film, such that the second metal thin-film electrode faces the first metal thin-film electrode across the second dielectric film, wherein
the surface of the first dielectric film has a surface energy ranging from 25 mN/m to 40 mN/m.
2. The metalized film capacitor according to claim 1, wherein the first dielectric film includes
a base film having a surface, and
a foundation layer provided on the surface of the base film, the foundation layer being made of any one of a silicon-based compound, a fluorine-based compound, and a hydrocarbon-based compound, the foundation layer being placed on the surface of the first dielectric film, the foundation layer contacting the first metal thin-film electrode.

3. The metalized film capacitor according to claim 2, wherein the foundation layer is made of a material having a smaller surface energy than the base film.

4. The metalized film capacitor according to claim 1, wherein the first dielectric film includes
- a base film containing an additive made of any one of a silicon-based compound, a fluorine-based compound, and a hydrocarbon-based compound, the base film having a surface, and
- a surface layer provided on the surface of the first dielectric film, the surface layer being made of the additive bleeding out on the surface of the base film.

5. The metalized film capacitor according to claim 4, wherein the additive is made of a material having a surface energy smaller than a surface energy of a main material of the base film.

6. The metalized film capacitor according to claim 1, wherein the first dielectric film is made of a base film containing an additive made of any one of a silicon-based compound, a fluorine-based compound, and a hydrocarbon-based compound.

7. The metalized film capacitor according to claim 6, wherein the additive made of a material having a surface energy smaller than a surface energy of a main material of the base film.

8. The metalized film capacitor according to claim 1, further including:
- a first metal-sprayed electrode connected to the first metal thin-film electrode; and
- a second metal-sprayed electrode connected to the second metal thin-film electrode.

* * * * *